(12) United States Patent
Mizuno et al.

(10) Patent No.: US 7,390,983 B2
(45) Date of Patent: Jun. 24, 2008

(54) SWITCH LOCK APPARATUS, PORTABLE COMPUTER, AND ELECTRONIC APPARATUS

(75) Inventors: Yusuke Mizuno, Kawasaki (JP); Toyokazu Hamaguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 191 days.

(21) Appl. No.: 11/354,254

(22) Filed: Feb. 15, 2006

(65) Prior Publication Data

US 2006/0191776 A1 Aug. 31, 2006

Related U.S. Application Data

(63) Continuation of application No. PCT/JP03/10379, filed on Aug. 15, 2003.

(51) Int. Cl.
*H01H 9/18* (2006.01)

(52) U.S. Cl. .................. 200/61.7; 361/680; 200/333

(58) Field of Classification Search .......... 200/5 A, 200/43.22, 50.1, 61.62, 61.7, 61.71, 61.73, 200/61.74, 61.76, 61.81, 333; 341/22; 345/156, 345/168, 169; 361/680; 379/433, 434
See application file for complete search history.

(56) References Cited

U.S. PATENT DOCUMENTS 5,001,910 A * 3/1991 Harmelink et al. ......... 68/12.05
5,077,551 A * 12/1991 Saitou ..................... 345/207
5,117,073 A * 5/1992 Mischenko .............. 200/61.7
5,635,928 A * 6/1997 Takagi et al. ............... 341/22
5,943,041 A * 8/1999 Allison et al. ............. 345/168
6,011,544 A * 1/2000 Sato ........................ 345/168
6,191,938 B1 * 2/2001 Ohgami et al. ............ 361/681
6,373,006 B1 * 4/2002 Toki ........................ 200/61.7
6,529,370 B1 * 3/2003 Kamishima ............... 361/680
6,642,462 B2 * 11/2003 Ninomiya et al. .......... 200/61.7
6,880,796 B2 * 4/2005 Khor et al. ................ 248/677
6,906,698 B2 * 6/2005 Tachikawa et al. ......... 345/156
7,221,561 B2 * 5/2007 Pan et al. .................. 361/680

FOREIGN PATENT DOCUMENTS

| JP | 2-111834 U | 9/1990 |
|---|---|---|
| JP | 8-22353 A | 1/1996 |
| JP | 8-263171 A | 10/1996 |
| JP | 10-116134 A | 5/1998 |
| JP | 2001-45118 A | 2/2001 |
| JP | 2003-29871 A | 1/2003 |

* cited by examiner

*Primary Examiner*—Michael A Friedhofer
(74) *Attorney, Agent, or Firm*—Arent Fox LLP

(57) ABSTRACT

A switch lock apparatus includes a switching mechanism configured to switch a switch provided at a main body part where a cover body is rotatably provided to a lock-off state where operation can be done or a lock-on state where the operation cannot be done, and an interlocking mechanism configured to control the switching mechanism so that the switch is switched to be in the lock-on state based on the cover body being rotated to a closing position.

9 Claims, 12 Drawing Sheets

SWITCH LOCK APPARATUS, PORTABLE COMPUTER, AND ELECTRONIC APPARATUS

CROSS-REFERENCE TO RELATED APPLICATION

This application is a U.S. continuation application filed under 35 USC 111(a) claiming benefit under 35 USC 120 and 365(c) of PCT application JP03/10379, filed on Aug. 15, 2003. The foregoing application is hereby incorporated herein by reference.

BACKGROUND OF THE INVENTION

1. Field of the Invention

The present invention generally relates to switch lock apparatuses, portable computers, and electronic apparatuses, and more specifically, to a switch lock apparatus configured to lock an application switch or the like when a cover body is closed, a portable computer using this switch lock apparatus, and an electronic apparatus.

2. Description of the Related Art

A portable electronic apparatus having a liquid crystal display apparatus has a structure where a display having the liquid crystal display apparatus can be opened and closed against a apparatus main body so that the liquid crystal display apparatus can be protected, and compactness at the time when it is carried can be improved.

FIG. 1 is a perspective view of a related art portable computer 50 as an example of the portable electronic apparatus. The portable computer 50 is a so-called notebook type personal computer and includes a computer main body part 52 and a display part 53.

Various apparatuses such as a key board 54, a CPU, a HDD, a memory, a modem, a battery, and the like are provided in the computer main body 52.

In addition, recently, an electric power switch and various control switches for staring an application, replaying audio, replaying video, and others are provided in the computer main body. Hereinafter, these switches are referred to as an application switch 57.

It is possible to immediately and easily start the application by the application switch 57. Hence, it is possible to improve the operability of the portable computer 50.

In addition, the application switch 57 is provided in the vicinity of the key board 54 of the computer main body 52 so that the operability of the application switch 57 per se is improved.

On the other hand, in the display part 53, a liquid crystal display apparatus 56 is mainly provided. The display part 53 can be opened and closed against the computer main body part 52. FIG. 1 shows a state where the display part 53 is opened against the computer main body part 52. In this state, the operator implements various processes by using the key board 54 based on the indication of the liquid crystal display apparatus 56.

When the portable computer 50 is carried or not used, the display apparatus 53 is rotated so as to be stuck on (closed against) the computer main body part 52. Because of this structure, the size of the portable computer 50 is made compact so that space efficiency and portability of the computer can be improved.

Thus, in the portable computer 50 having a structure where the display part 53 can be opened and closed against the computer main body part 52, the space efficiency and the portability can be improved as discussed above. However, if the display part 53 is rotated so as to be stuck on the computer main body part 52 in a case where a fine article such as a paper piece or a clip is provided on the application switch 57, the application switch 57 may be pushed and therefore operated by the display part 53 via the fine article.

If the application switch is operated by the display part 53 via the fine article as mentioned above, although the display part 53 is closed, the electric power of the portable computer 50 may be turned on or the application corresponding to the application switch 57 may be started in error. In addition, consumption of electric power of a battery is increased by starting the portable computer 50 or turning on the back light of the liquid crystal display apparatus 56 in a state where the display part 53 is closed. In addition, the ability to radiate heat of the back light is reduced so that the display part 53 and the computer main body part 52 are heated.

In order to prevent the application switch 57 from being pushed by the foreign article at the time of closing the display part 53 or prevent the error operation of the application switch 57 by the operator, the application switch 57 may be provided recessed from a surface of the computer main body apparatus 52. However, under this structure, the pushing operation of the application switch 57 by the operator may be difficult and the operability is reduced.

SUMMARY OF THE INVENTION

Accordingly, it is a general object of the present invention to provide a novel and useful switch lock apparatus, portable computer, and electronic apparatus.

Another and more specific object of the present invention is to provide a switch lock apparatus, portable computer, and electronic apparatus whereby an error operation of a switch such as a so-called an application switch or the like can be prevented.

The above object of the present invention is achieved by a switch lock apparatus, including:

a switching mechanism configured to switch a switch provided at a main body part where a cover body is rotatably provided to a lock-off state where operation can be done or a lock-on state where the operation cannot be done; and an interlocking mechanism configured to control the switching mechanism so that the switch is switched to be in the lock-on state based on the cover body being rotated to a closing position.

According to the above-mentioned switch lock apparatus, based on the cover body being rotated to the closing position, a driving part drives the switching mechanism so that the switch is switched to be in the lock-on state. Hence, it is possible to prevent the switch from being operated in error due to closing the cover.

The interlocking mechanism may include a cam part moving based on the rotation of the cover body, an arm part configured to drive the switching mechanism by being moved, and a converting mechanism configured to convert the movement of the cam part to the movement of the arm.

According to the above-mentioned switch lock apparatus, the converting mechanism is driven so that the operation of the cam part moving based on the rotation of the cover body is converted to the operation of the arm. Therefore, it is possible to make a structure of an open and close detection apparatus simple and compact.

The cam part may be formed by a concave part formed in a support shaft rotating in a body with the cover body.

According to the above-mentioned switch lock apparatus, since the cam part is provided in the support shaft rotating in a body with the cover body, it is possible to improve precision for detecting the opening and closing of the cover body. In addition, since the cam part is formed by the concave part formed in the support shaft, it is possible to easily form the cam part to the support shaft.

The switch may be formed by a button part and a switch main body provided so as to face the button part; and the switching mechanism may be formed by a sheet member, the sheet member movably being provided between the button part and the switch main body part, the sheet member having a piercing hole facing the button part and the switch main body in the lock-off state.

According to the above-mentioned switch lock apparatus, the switch can be locked-on or locked-off by only moving the sheet member movably provided between the button part and the switch main body part which form the switch. Therefore, it is possible to prevent an error in operation of the switch simply and securely.

The interlocking mechanism may include a rotation detection switch configured to detect rotation of the cover body, a solenoid configured to drive the switching mechanism, and a control part configured to drive the solenoid so that the switch is switched to the lock-on state, when the cover body is rotated to the switch lock position, by the rotation detection switch.

According to the above-mentioned switch lock apparatus, the rotation of the cover body is detected by the rotation detection switch and the switch is electrically switched to the lock-on state by using the solenoid. Therefore, it is possible to implement the lock of the switch when the cover body is closed with high reliability.

The above object of the present invention is achieved by a portable computer having a computer main body to which a display part is rotatably provided and where a switch is provided, the portable computer including: a switching mechanism configured to switch the switch to a lock-off state where operation can be done or a lock-on state where the operation cannot be done, and an interlocking mechanism configured to control the switching mechanism so that the switch is switched to be in the lock-on state based on the display part being rotated to a closing position.

According to the above-mentioned portable computer, based on the display part being rotated to the closing position, a driving part drives the switching mechanism so that the switch is switched to be in the lock-on state. Hence, it is possible to prevent the switch from being operated in error due to closing the display part.

The interlocking mechanism may include a cam part moving based on the rotation of the display part, an arm part configured to drive the switching mechanism by being moved, and a converting mechanism configured to convert the movement of the cam part to the movement of the arm.

According to the above-mentioned portable computer, the converting mechanism is driven so that the operation of the cam part moving based on the rotation of the display part is converted to the operation of the arm. Therefore, it is possible to make a structure of an open and close detection apparatus simple and compact.

The cam part may be formed by a concave part formed in a support shaft rotating in a body with the display part.

According to the above-mentioned portable computer, since the cam part is provided in the support shaft rotating in a body with the display part, it is possible to improve precision for detecting the opening and closing of the display part. In addition, since the cam part is formed by the concave part formed in the support shaft, it is possible to easily form the cam part in the support shaft.

The switch may be formed by a button part and a switch main body provided so as to face the button part, and the switching mechanism may be formed by a sheet member, the sheet member being movably provided between the button part and the switch main body part, the sheet member having a piercing hole facing the button part and the switch main body in the lock-off state.

According to the above-mentioned potable computer, the switch can be locked-on or locked-off by only moving the sheet member movably provided between the button part and the switch main body part which form the switch. Therefore, it is possible to prevent an error in operation of the switch simply and securely.

The interlocking mechanism may include a rotation detection switch configured to detect rotation of the display part, a solenoid configured to drive the switching mechanism, and a control part configured to drive the solenoid so that the switch is switched to the lock-on state, when the display part is rotated to the switch lock position, by the rotation detection switch.

According to the above-mentioned portable computer, the rotation of the display part is detected by the rotation detection switch and the switch is electrically switched to the lock-on state by using the solenoid. Therefore, it is possible to implement the locking of the switch when the display part is closed with high reliability.

The above object of the present invention is achieved by an electronic apparatus having a second housing to which a first housing is rotatably provided and where a switch is provided, the electronic apparatus including:

a switching mechanism configured to switch the switch to a lock-off state where an operation can be done or a lock-on state where the operation cannot be done; and an interlocking mechanism configured to control the switching mechanism so that the switch is switched to be in the lock-on state based on the first housing being rotated to a closing position.

According to the above-mentioned electronic apparatus, based on that the first housing is rotated to the closing position, a driving part drives the switching mechanism so that the switch is switched to be in the lock-on state. Hence, it is possible to prevent the switch from being operated in error due to closing of the first housing.

The interlocking mechanism may include a cam part moving based on the rotation of the first housing, an arm part configured to drive the switching mechanism by being moved, and a converting mechanism configured to convert the movement of the cam part to the movement of the arm.

According to the above-mentioned electronic apparatus, the converting mechanism is driven so that the operation of the cam part moving based on the rotation of the first housing is converted to the operation of the arm. Therefore, it is possible to make a structure of an opening and closing detection apparatus simple and compact.

The cam part may be formed by a concave part formed in a support shaft rotating in a body with the first housing.

According to the above-mentioned electronic apparatus, since the cam part is provided in the support shaft rotating in a body with the housing part, it is possible to improve precision for detecting the opening and closing of the first housing. In addition, since the cam part is formed by the concave part formed in the support shaft, it is possible to easily form the cam part in the support shaft.

The switch may be formed by a button part and a switch main body provided so as to face the button part, and the switching mechanism may be formed by a sheet member, the sheet member being movably provided between the button part and the switch main body part, the sheet member having a piercing hole facing the button part and the switch main body in the lock-off state.

According to the above-mentioned potable computer, the switch can be locked-on or locked-off by only moving the sheet member movably provided between the button part and the switch main body part which form the switch. Therefore, it is possible to prevent an error in operation of the switch simply and securely.

The interlocking mechanism may include a rotation detection switch configured to detect rotation of the first housing, a solenoid configured to drive the switching mechanism, and a control part configured to drive the solenoid so that the switch is switched to the lock-on state, when the first housing is rotated to the switch lock position, by the rotation detection switch.

According to the above-mentioned electronic apparatus, the rotation of the first housing is detected by the rotation detection switch and the switch is electrically switched to the lock-on state by using the solenoid. Therefore, it is possible to implement the locking of the switch when the first housing is closed with high reliability.

Other objects, features, and advantages of the present invention will be come more apparent from the following detailed description when read in conjunction with the accompanying drawings.

DETAILED DESCRIPTION OF THE PREFERED EMBODIMENTS

A description is given below, with reference to the FIG. 2 through FIG. 13, of embodiments of the present invention.

Figure 1:
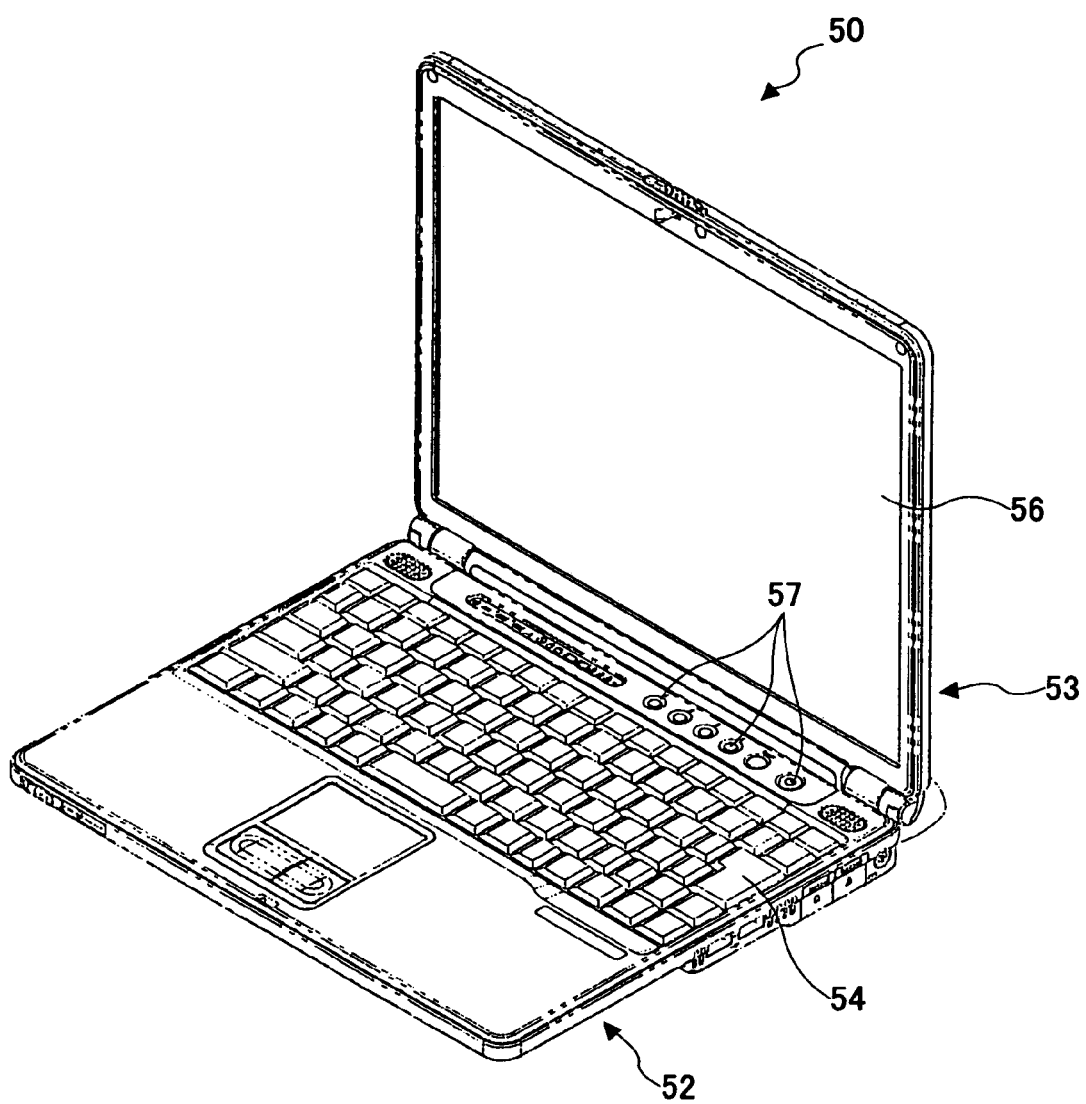
FIG. 1 is a perspective view of a related art portable computer.
Figure 2:
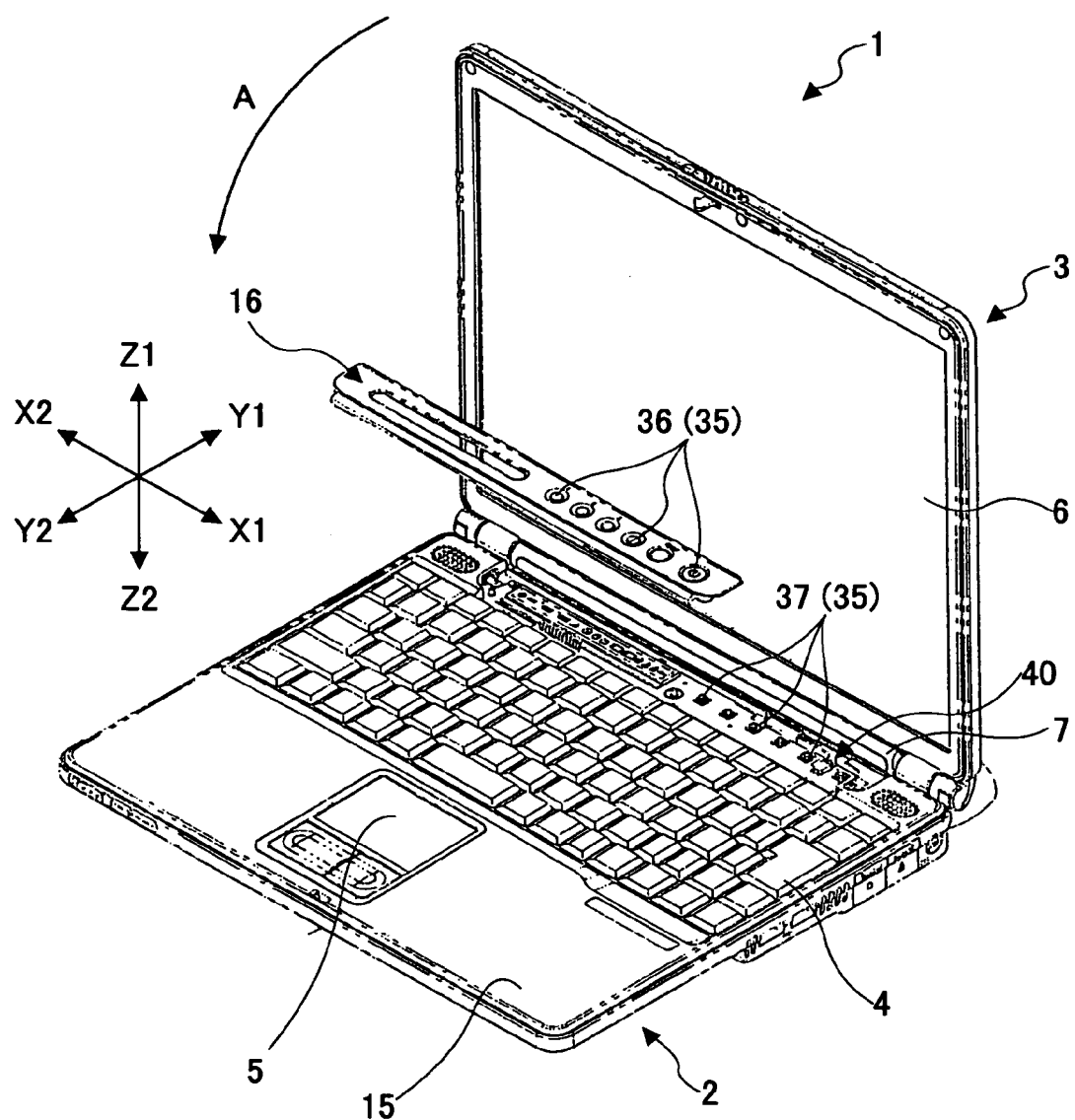
FIG. 2 is a perspective view of a portable computer where a switch lock apparatus of a first embodiment of the present invention is installed.

FIG. 2 is a perspective view of a portable computer 1 where a switch lock apparatus of a first embodiment of the present invention is installed. The portable computer 1 is a so-called notebook type personal computer and includes a computer main body part 2 which corresponds to a main body part and a second housing in the following claims and a display part 3 which corresponds to a housing or a first housing in the following claims.

Various apparatuses such as a CPU, a HDD, a memory, a modem, a battery, and the like are installed in the computer main body 2.

A key board 4, a flat point 5, an application switch 35 (hereinafter AP switch), and others are provided on an upper case 15 of the computer main body 2. In addition, a lock apparatus 40 described below is installed in an inside of the computer main body 2.

The AP switch 35 includes an electric power switch and various control switches for staring an application, replaying audio, replaying a video, and others. Normally, the AP switch 35 is a push switch and the application is started by pushing the AP switch 35.

It is possible to immediately and easily start the application by the AP switch 35. Hence, it is possible to improve the operability of the portable computer 1.

In addition, the application switch 35 is provided in the vicinity of the key board 4 of the computer main body 2 so that the operability of the AP switch 35 per se is improved. However, the AP switch 35 is located at a position, as discussed above, where the pushing operation may be implemented if the display part 3 is closed while a fine article is provided.

On the other hand, in the display part 3, a liquid crystal display apparatus 6 is mainly provided. A back light is provided at a back part of the liquid crystal display apparatus 6. The display part 3 can be opened and closed against the computer main body part 2 with respect to a support shaft 7. In this embodiment, the support shaft 7 is rotated in a body with the display part 3 with the opening and closing of the display part 3.

FIG. 2 shows a state where the display part 3 is opened away from the computer main body part 2. In this state, the operator implements various processes by using the key board 4 based on the indication of the liquid crystal display apparatus 6.

When the portable computer 1 is carried or not used, the display part 3 is rotated in a direction shown by an arrow A so as to be stuck on the computer main body part 2. Because of this structure, the size of the portable computer 1 is made compact so that space efficiency and portability of the computer can be improved.

Next, the lock apparatus 40 provided in the portable computer 1 is discussed with reference to FIG. 3 through FIG. 11 in addition to FIG. 2.

The lock apparatus 40 includes a sheet member 41. The sheet member 41 forms a switching mechanism for switching a lock-off state where the AP switch 35 can be operated and a lock-on state where the AP switch 35 cannot be operated. The AP switch 35 is locked on by working the sheet member 41 by rotating the display part 3 to a closing position.

Figure 3:
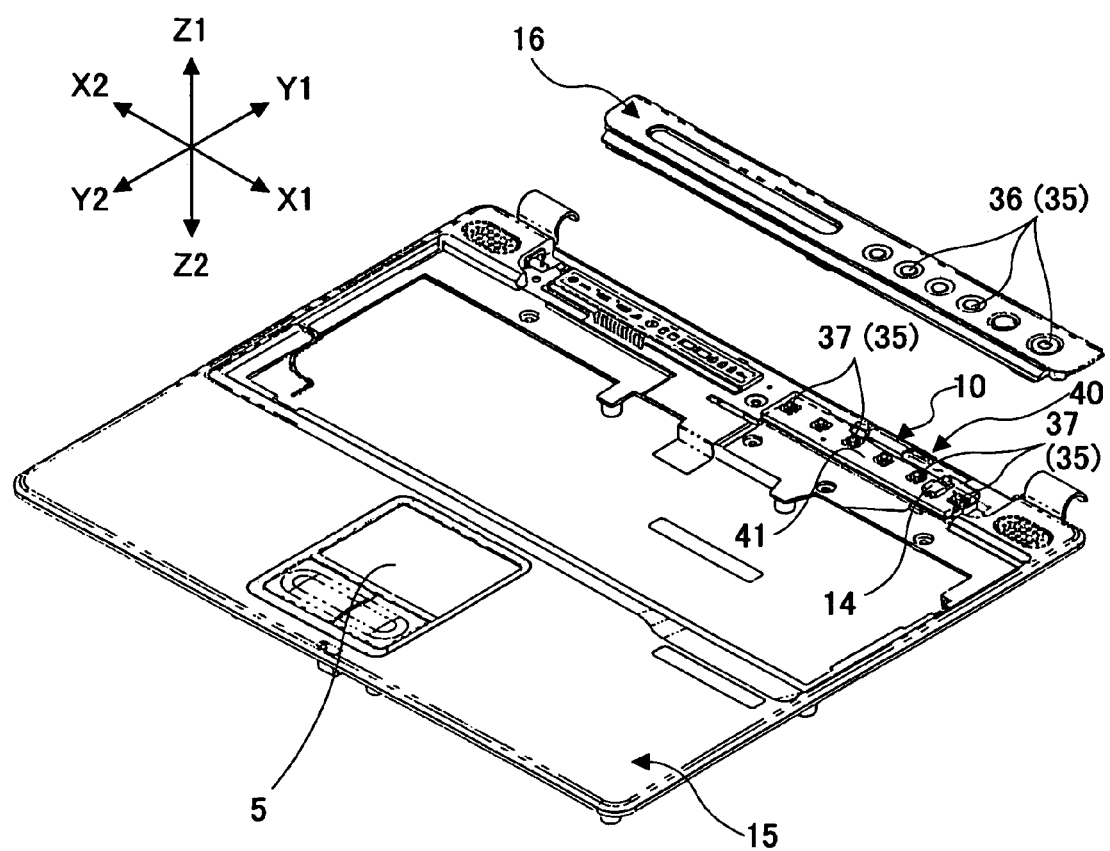
FIG. 3 is an expanded perspective view of the switch lock apparatus of the first embodiment of the present invention.
Figure 6:
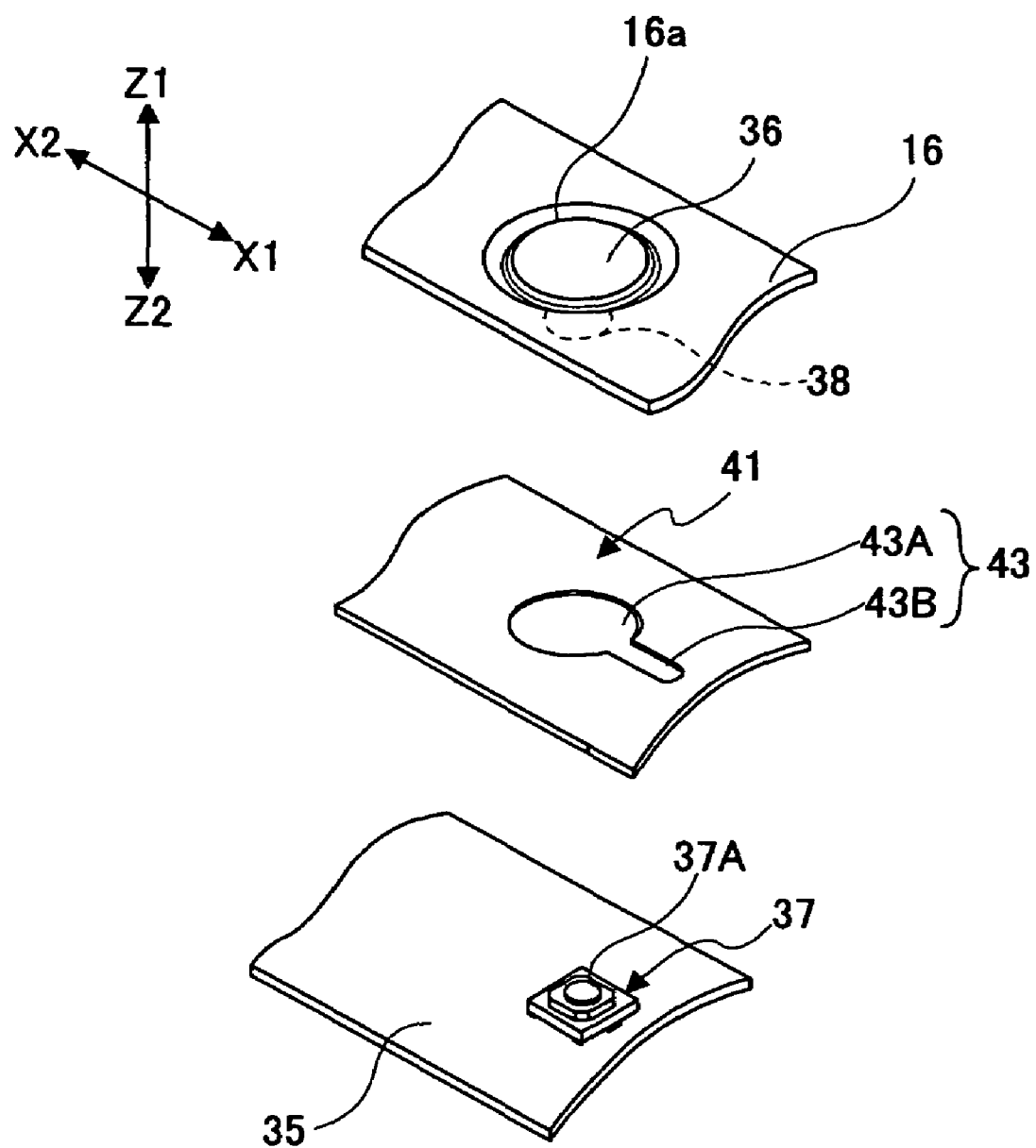
FIG. 6 is an exploded perspective view of an AP(application) switch.

Before the explanation of the lock apparatus 40 and the sheet member 41, a structure of the AP switch 35 for locking by the lock apparatus 40 and the sheet member 41 is discussed. As shown in FIG. 2, FIG. 3 and FIG. 6, the AP switch 35 includes a button part 36 and a switch main body part 37.

The button part 36 is operated by the operator of the portable computer 1. The button part 36 is provided in a decorative panel 16 provided on the upper case 15. The button part 36 can be moved in upper and lower directions, namely directions shown by arrows Z1 and Z2, in an opening 16a formed in the decorative panel 16. A projection part 38 (See FIG. 6) projecting to a lower part is formed at a lower part of the button part 36.

The switch main body part 37 is a small-sized switch for on/off operation by pushing the switch main body part 37. The switch main body part 37 is provided at a circuit board 32 (See FIG. 4) provided in the upper case 15 of the computer main body 2. The button part 36 faces the switch main body 37 in a state where the above-mentioned decorative panel 16 is installed in the upper case 15.

More specifically, in the state where the above-mentioned decorative panel 16 is installed in the upper case 15, the projection part 38 of the button part 36 faces the operation part 37A of the switch main body 37. Therefore, the projection part 38 pushes the operation part 37A by the pushing of the button part 36 by the operator of the portable computer 1 so as to perform the on/off operation of the switch main body part 37.

Figure 4:
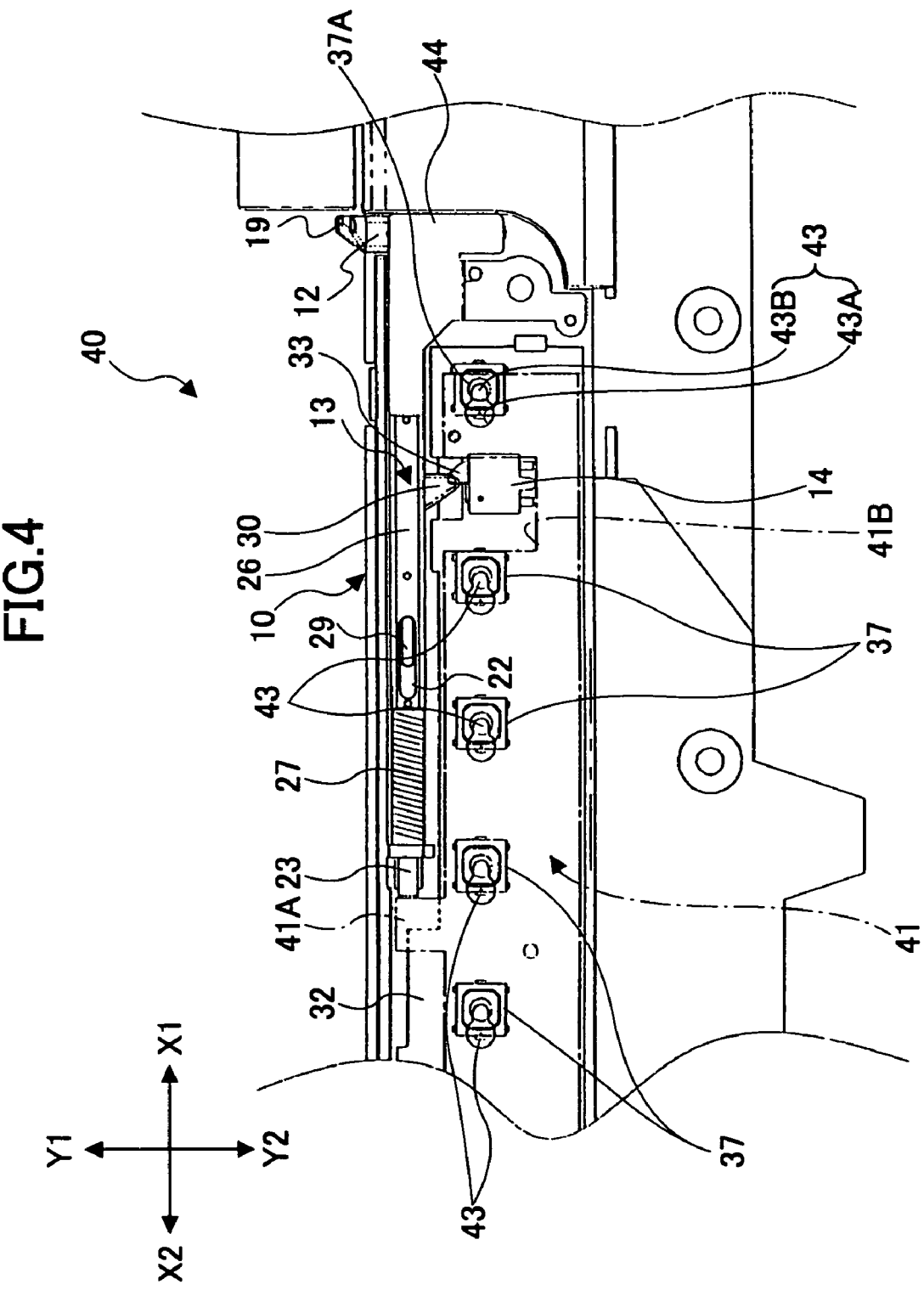
FIG. 4 is an expanded cut-away plan view of the switch lock apparatus of the first embodiment of the present invention in a lock-off state.
Figure 5:
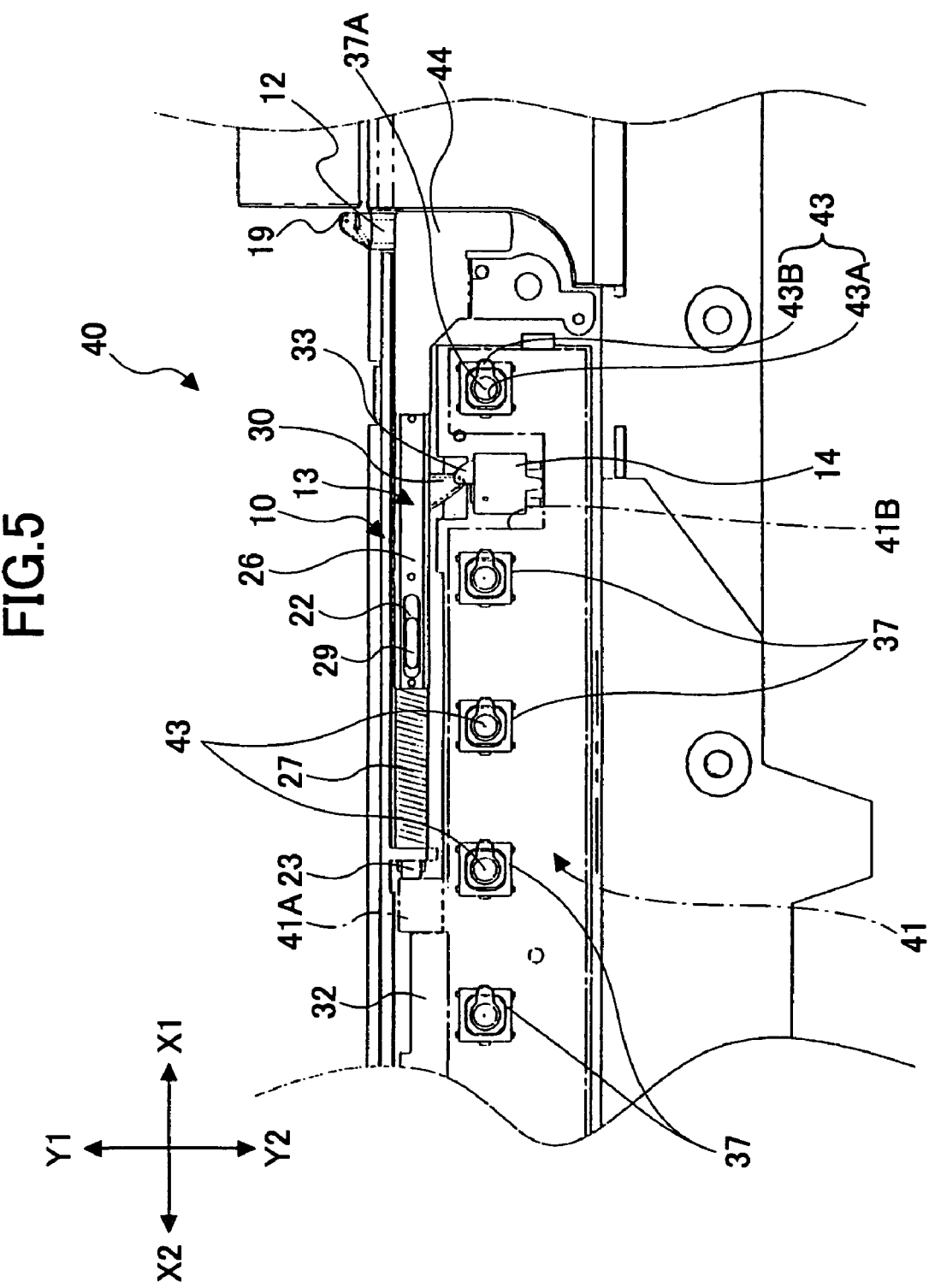
FIG. 5 is an expanded cut-away plan view of the switch lock apparatus of the first embodiment of the present invention in a lock-on state.

Next, details of the sheet member 41 are discussed. The sheet member 41 is a sheet-state member made of resin such as acrylic. The sheet member 41 is provided at a lower part of the circuit board where the switch main body part 37 is provided and a lower part of the decorative panel 16 where the button part 36 is provided. In other words, as shown in FIG. 6, the sheet member 41 is provided between the button part 36 and the switch main body part 37. In FIG. 4 and FIG. 5, the sheet member 41 is indicated by a one-dotted line.

Figure 7:
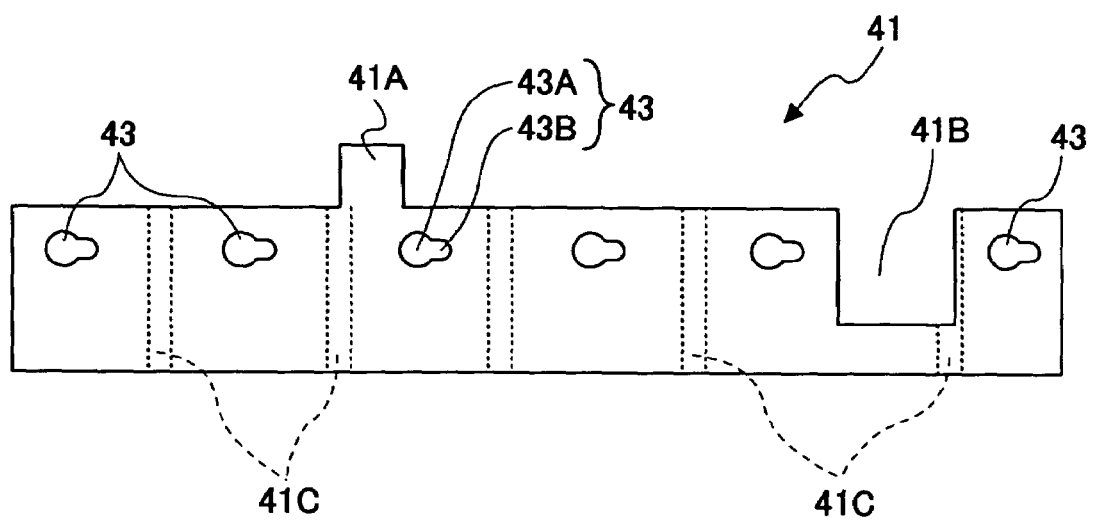
FIG. 7 is an expanded plan view of a sheet member.

As shown expanded in FIG. 7, the sheet member 41 has a structure where an operated part 41A, a concave part 41B, a rib part 41C and plural piercing hole forming parts 43 are formed. An interlocking mechanism 10 discussed below is engaged with the operated part 41A. The operated part 41A is operated by the interlocking mechanism 10 so that the sheet member moves in X1 and X2 directions. The concave part 41B is situated so as to not come in contact with a rotation detection switch 14 provided in the circuit board 32 when the sheet member 41 moves in the X1 and X2 directions.

The rib parts 41C are projections formed at a back side of the sheet member 41, namely a side facing the circuit board 32. Plural rib parts 41C are formed with designated gaps (intervals). The rigidity of the sheet member 41 can be heightened by providing the rib parts 41C so that it is possible to prevent the sheet member 41 having a sheet shape from being deformed when the sheet member 41 is moved in the X1 and X2 directions.

The piercing hole forming parts 43 are formed with designated gaps (intervals) the same as the gaps (intervals) of the switch main body parts 37 on the circuit board 32. The piercing hole 43, expanded as shown in FIG. 6 in this embodiment, includes a large hole forming part 43A and a small hole forming part 43B. The diameter of the large hole forming part 43A is larger than the diameter of the projection part 38 formed at the button part 36. On the other hand, the width of the small hole forming part 43B is smaller than the width of the projection part 38.

Therefore, in a case where the small hole forming part 43B of the piercing hole 43 is positioned between the projection part 38 of the button part 36 and the operation part 37A of the switch main body 37 as accompanying the movement of the sheet member 41 in the X1 and X2 directions (namely, in a state shown in FIG. 10), even if the button part 36 is pushed, the projection part 38 comes in contact with the sheet member 41 and therefore the operation part 37A is not operated. In other words, in the case where the small hole forming part 43B of the piercing hole 43 is positioned between the projection part 38 of the button part 36 and the operation part 37A of the switch main body 37, the AP switch 35 is in the lock-on state.

On the other hand, in a case where the large hole forming part 43A of the piercing hole 43 is positioned between the projection part 38 of the button part 36 and the operation part 37A of the switch main body 37 as accompanying the movement of the sheet member 41 in the X1 and X2 directions (namely, in a state shown in FIG. 11), since the diameter of the large hole forming part 43A is larger than the diameter of the projection part 38, if the button part 36 is pushed, the projection part 38 pierces the large hole forming part 43A, that is the operation part 37A is operated without coming in contact with the sheet member 41.

In other words, in the case where the large hole forming part 43A of the piercing hole 43 is positioned between the projection part 38 of the button part 36 and the operation part 37A of the switch main body 37, the AP switch 35 is in the lock-off state.

Figure 8:
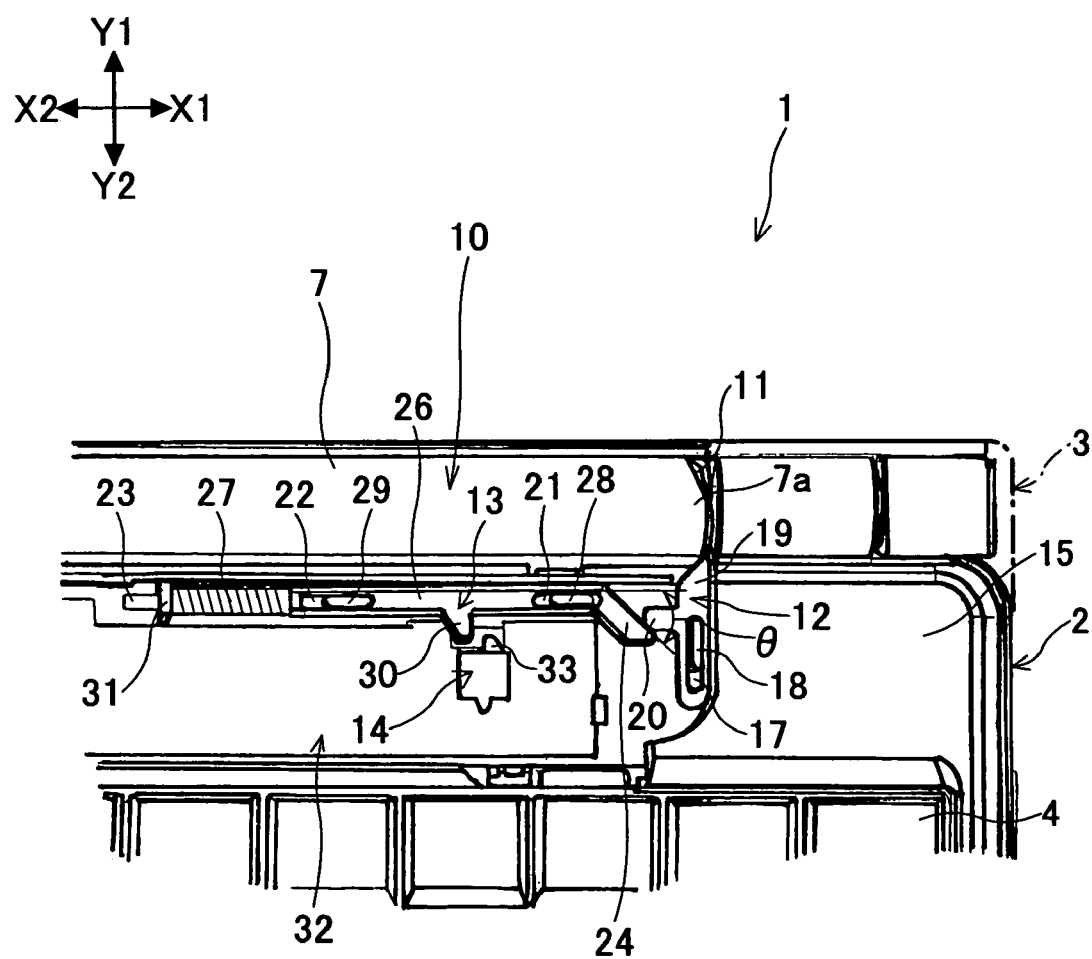
FIG. 8 is a cut-away view for explaining a structure and an operation of an interlocking mechanism of the switch lock apparatus and shows a state where a display part is closed.
Figure 9:
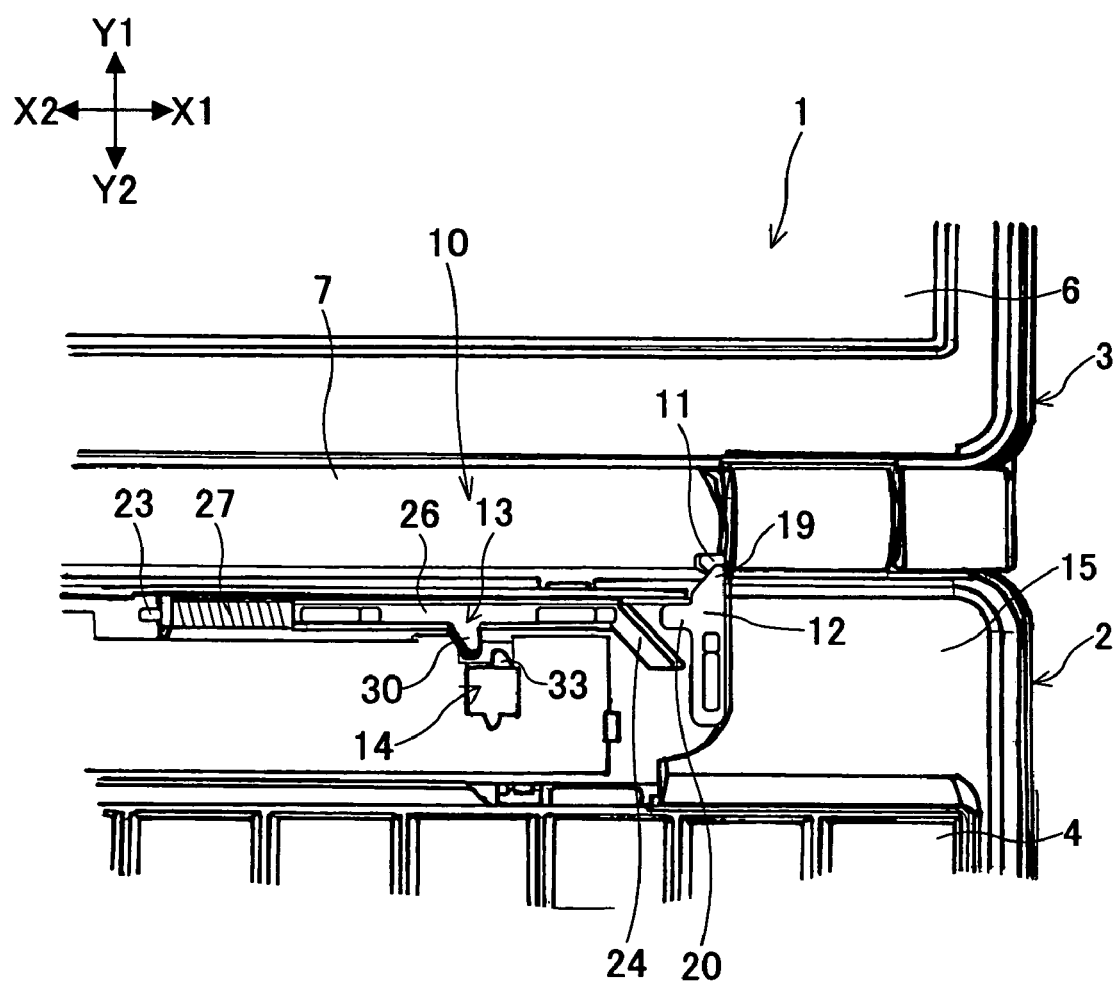
FIG. 9 is a cut-away view for explaining the structure and the operation of the interlocking mechanism of the switch lock apparatus and shows a state where a display part is opened.

Next, the interlock mechanism forming the lock apparatus 49 is discussed with reference to FIG. 8, FIG. 9 and others. FIG. 8 and FIG. 9 are expanded views of the vicinity of the support shaft 7 in a state where the decorative panel 16, the sheet member 41 and the cover plate 44 (See FIG. 4 and FIG. 5) are removed. More specifically, FIG. 8 shows a state where the display part 3 is closed, namely lock-on state of the AP switch 35. FIG. 9 shows a state where the display part 3 is opened, namely lock-off state of the AP switch 35.

As interlocking with open and close states of the display part 3, the interlocking mechanism 10 switches a lock-on state or a lock-off state of the above-mentioned AP switch 35. In this embodiment, a rotation detection switch 14 is provided in the interlocking mechanism 10. Accordingly, it is possible to make the liquid crystal display apparatus 6 be in a sleep mode when the display apparatus 3 is closed, based on a signal from the rotation detection switch 14. Because of this, it is possible to prevent the increase of temperature when the liquid crystal display apparatus 3 is not used and to reduce the unnecessary consumption of electric power of the battery. It is also possible to make not only the liquid crystal display apparatus 6 but also a part of the entire of the hardware of the computer main body part 2 be in the sleep mode.

The interlocking mechanism 10 includes a cam part 11, a first arm 12, a second arm 13, a rotation detection switch 14, and others. The cam part 11 is a concave part formed in a body at the support shaft 7. Hence, the cam part 11 is rotated accompanying the rotation of the support shaft 7 accompanying the opening and closing of the display part 3. In other words, the cam part 11 is rotated as corresponding to the open and close of the display part 3. Since the cam part 11 is a concave part, it is possible to easily form the cam part 11 at the support shaft 7.

As discussed below, the cam part 11 is engaged with the first arm 12 in a state where the display part 3 is opened (See FIG. 9). On the other hand, in a state where the display part 3 is closed as shown in FIG. 8, the cam part 11 is separated from the first arm 12 and engages (slide-contacts) with an end part 7a of the support shaft 7.

The first arm 12 has a structure where a long hole forming part 17, a slide-contact part 19 and a lever part 20 are formed in a body. The long hole forming part 17 is a hole extending in Y1 and Y2 directions. A guide projection part 18 formed in the upper case 15 is engaged with the long hole forming part 17. The guide projection part 18 has a long elliptic configuration extending in the Y1 and Y2 directions. Accordingly, the first arm 12 is guided by the guide projection part 18 so that the first arm 12 can be moved on the computer main body part 2 in the Y1 and Y2 directions.

The slide-contact part 19 is formed at the end part in a Y1 direction of the first arm 12. The head end of the slide-contact part 19 makes sliding contact with the external circumference of the end part 7a of the support shaft 7. In addition, the lever part 20 extends in a direction perpendicular to the moving direction of the first arm 12, namely an X2 direction. The lever part 20 forms an amplification mechanism with an inclination lever 24 formed in the second arm 13 described below.

Next, the second arm 13 is discussed. The second arm 13 is an arm extending largely in the X1 and X2 directions. The second arm 13 has a structure where long-hole forming parts 21 and 22, a shaft part 23, the inclination lever 24, an arm main body 26 and a switch lever 30 are formed in a body.

The long-hole forming parts 21 and 22 are holes formed in the arm main body 26 and extend in the X1 and X2 directions. The long hole forming parts 21 and 22 are engaged with the guide projection parts 28 and 29, respectively, formed in the computer main body part 2. The guide projection part 29 has a long elliptic configuration extending in the X1 and X2 directions. Accordingly, the second arm 13 is guided by the guide projection parts 28 and 29 so that the second arm 13 can be moved on the upper case 15 in the X1 and X2 directions.

The shaft part 23 has a circular cylinder configuration and is thinner than the arm main body 26. The support shaft 23 extends in the X2 direction from an end part in the X2 direction of the arm main body 26. The support shaft 23 is movably supported by a support part 31 formed in the computer main body 2. In other words, a piercing hole forming part is formed in the support part 31. The shaft part 23 is inserted in the piercing hole forming part so as to be supported by the support part 31.

As shown in FIG. 4 and FIG. 5, the operated part 41A formed in the sheet member 41 is connected to an end part in the X2 direction of the shaft part 23. Therefore, accompanying with the movement of the second arm 13 in the X1 and X2 directions, the sheet member 41 is moved in the X1 and X2 directions.

In addition, a coil spring 27 is provided between the support part 31 and the end part in the X2 direction of the arm main body 26. The coil spring 27 is provided so that the shaft part 23 is inserted therein. An end part of the coil spring 27 in the X2 direction comes in contact with the support part 31 and an end part of the coil spring 27 in the X1 direction comes in contact with the arm main body 26 because the shaft part 23 is thinner than the arm main body 26. The coil spring 27 is provided between the end part of the arm main body 26 and the support part 31 in a compression state. Because of this, the second arm 13 is always energized in the X1 direction by an elastic force of the coil spring 27.

On the other hand, the inclination lever 24 is formed at an end part in the X1 direction of the second arm 13. The inclination lever 24 is a lever having an inclination shown as "θ" in FIG. 8 that is an inclination tilting in the Y2 direction from the X1 direction. The inclination lever 24 is engaged with the lever part 20 formed in the above-mentioned first arm 12.

In the meantime, as discussed above, the second arm 13 is energized in the X1 direction by the elastic force of the coil spring 27 so that an energizing force is transferred to the slide contact part 19 by the engagement of the inclination lever 24 and the lever part 20. In addition, the inclination lever 24 has an inclination of the angle θ. Hence, the energizing force in the X1 direction is divided and one of the divided force acts as a force moving the first arm 12 in the Y1 direction. In other words, the coil spring 27 energizes the first arm 12 in the Y1 direction. Therefore, the first arm 12, more specifically the slide contact part 19, always maintains a contact state with the support shaft 7.

The switch lever part 30 extends in the Y2 direction. Based on the moving of the second arm 13 in the X1 and X2 directions, the switch lever part 30 is engaged with the switch knob 33 so that the rotation detection switch 14 is turned on or off.

The rotation detection switch 14 is fixed to the circuit board 32 provided in the computer main body 2. The rotation detection switch 14 is a switch turned on or off by operation of the switch knob 33. In this embodiment, when the display part 3 is closed, in other words in a state shown in FIG. 4 or FIG. 8, the switch knob 33 is separated from the switch lever part 30 so that the rotation detection switch 14 is turned off. When the display part 3 is opened, in other words in a state shown in FIG. 5 or FIG. 9, the switch knob 33 is engaged with the switch lever part 30 so that the rotation detection switch 14 is turned on.

Next, an operation of the lock apparatus 40 having the above-discussed structure is discussed.

First, the lock apparatus 40 in a state where the display part 3 is opened as shown in FIG. 5 and FIG. 9 is discussed. In the state where the display part 3 is opened, the slide-contact part 19 of the first arm 12 forming the interlocking mechanism 10 is positioned in the cam part 11 formed in the support shaft 7.

In addition, the second arm 13 is moved in the X1 direction so that the switch lever part 30 pushes the switch knob 33 of the rotation detection switch 14. In other words, the rotation detection switch 14 is turned on.

Figure 11:
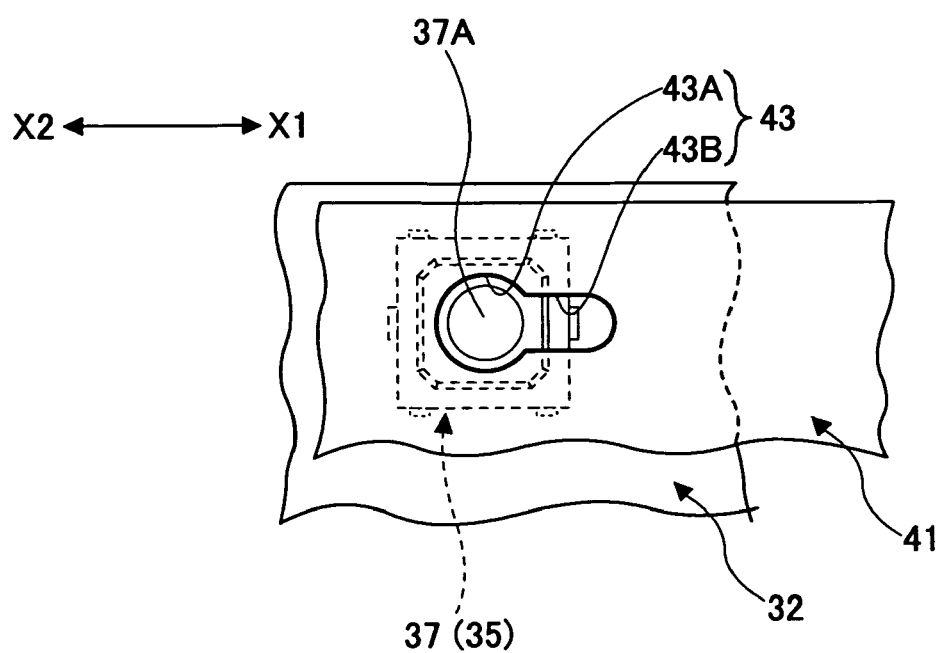
FIG. 11 is a view for explaining movement of the sheet member and shows the sheet member in the lock-off state.

Furthermore, by moving the second arm 13 in the X1 direction, the sheet member 41 connected to the shaft part 23 of the second arm 13 is moved in the X1 direction. Thus, as shown in FIG. 11, the sheet member 41 is moved in the X1 direction, so that the large hole forming part 43A of the piercing hole 43 formed in the sheet member 41 is positioned between the button part 36 (the projection part 38) forming the AP switch 35 and the switch main body 37 (the operation part 37A) and therefore locking is turned off.

As described above, the diameter of the large hole forming part 43A is larger than the diameter of the projection part 38. Because of this, if an operator of the portable computer 1 pushes the button part 36, the projection part 38 is inserted into the large hole forming part 43A, that is the operation part 37A is operated without coming in contact with the sheet member 41. Therefore, the AP switch 35 can be turned on. Thus, in the state where the display part 3 is opened, the AP switch 35 can be freely operated and therefore the application can be easily started with good operability.

Next, an operation of the lock apparatus 40 when the display part 3 is rotated from the opening state to the closing state is discussed.

The display part 3 is rotated from the opening state to the closing state so that the support shaft 7 is rotated. Based on this rotation, the cam part 11 is moved so as to be separated from the first arm 12 (the slide-contact part 19). In a state where the display part 3 is rotated so as to be in a position of just before closing where the display part 3 is completely closed, the cam part 11 formed at the support shaft 7 is completely separated from the first arm 12.

Here, the position of just before closing is a position where the display part 3 comes in contact with a foreign article put on the computer main body 2 in error when the display part 3 is closed. The position of just before closing is defined in advance through experience or experiment.

As discussed above, the cam part 11 (concave part) is separated from the first guide rail 12 based on the rotation of the support shaft 7, so that the slide-contact part 19 comes in contact with the external circumference of the support shaft 7, namely an external circumference other than a position where the cam part 11 is formed. Because of this, the rotation of the support shaft 7 is converted to a linear movement of the first arm 12 so that the first arm 12 is moved in the Y2 direction.

The first arm 12 is moved in the Y2 direction so that the lever part 20 formed in a body with the first arm 12 is moved in the Y2 direction linearly. As discussed above, the inclination lever 24 having a tilt angle θ is engaged with the lever part 20. Hence, the lever 20 is moved in the Y2 direction so that the second arm 13 is moved in the X2 direction against the elastic force of the coil spring 27.

The second arm 13 is moved in the X2 direction so that the switch lever part 30 formed in a body with the second arm 13 is moved in the X2 direction and thereby the switch lever part 30 is separated from the switch knob 33 of the rotation detection switch 14. See FIG. 8. Thus, the rotation detection switch 14 is turned off so that the display part 3 being closed is detected by the output of the rotation detection switch 14.

In this embodiment, the liquid crystal display apparatus 6 is placed in a sleep mode when the display part 3 is closed based on a signal from the rotation detection switch 14. Because of this, it is possible to reduce the unnecessary consumption of electric power of the battery and prevent the increase of the temperature when the liquid crystal display apparatus 6 is not being used.

Since the inclination lever 24 has an inclination of a tilt angle θ at a position where the first arm 12 and the second arm 13 are engaged, which is a position where the lever part 20 and the inclination lever 24 are engaged, if the lever part 20 is moved in the Y1 and Y2 directions, the second arm 13 is moved in the X1 and X2 directions, respectively. In other words, it is the position where the lever part 20 and the inclination lever 24 function as a moving direction changing mechanism configured to change the moving directions of the first arm 12, namely Y1 and Y2 directions, to the moving directions of the second arm 13, namely X1 and X2 directions.

By changing the tilt angle θ of the inclination lever 24, the moving amount of the second arm 13 against the moving amount of the first arm 12 can be changed. More specifically, the moving amount of the second arm 13 against the moving amount of the first arm 12 can be changed by making the tilt angle θ of the inclination lever 24 small. In other words, the lever part 20 and the inclination lever 24 function as an amplifying function for amplifying the moving amount of the second arm 13 against the moving amount of the first arm 12.

Thus, even if the depth of the cam part 11 is small and therefore the displacement of the first arm 12 is small, the moving amount of the second arm 13 can be made large by making the moving amount of the second arm 13 large. Accordingly, even if the moving amount of the first arm 12 by the cam part 11 is small, it is possible to operate the rotation detection switch 14 securely so that detection precision of opening and closing the display part 3 can be heightened.

Figure 10:
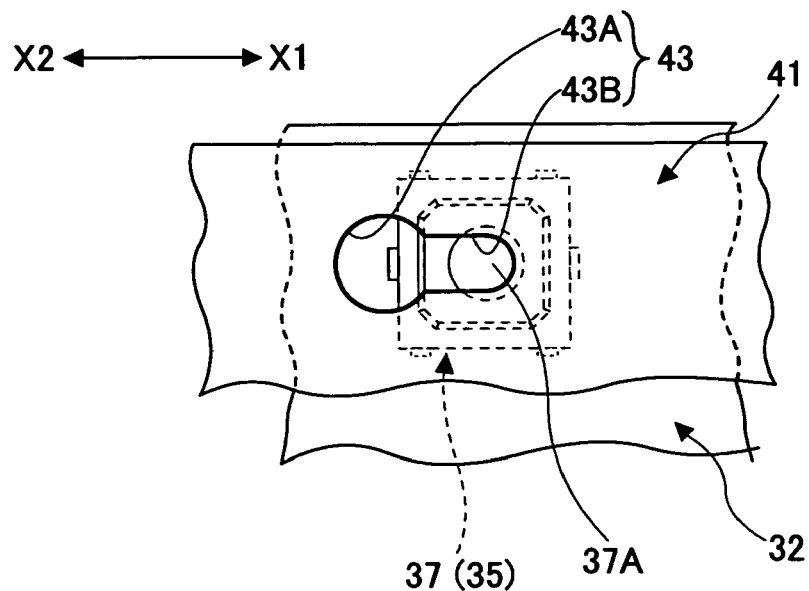
FIG. 10 is a view for explaining movement of the sheet member and shows the sheet member in the lock-on state.

In addition, the sheet member 41 connected to the shaft part 23 of the second arm 13 is moved in the X2 direction by moving the second arm 13 in the X2 direction. Thus, as shown in FIG. 10, the sheet member 41 is moved in the X2 direction, so that the piercing hole forming part 43 formed in the sheet member 41 is moved so that the small hole forming part 43B of the piercing hole 43, in a state of the position of just before closing, is positioned between the button part 36 (the projection part 38) forming the AP switch 35 and the switch main body 37 (the operation part 37A).

As discussed above, since the small hole forming part 43B is smaller than the projection part 38, in a case where the button part 36 is pushed, the projection part 38 comes in contact with the sheet member 41 and the operation part 37A is not operated. Accordingly, the AP switch 35 is in a lock-on state where even if the operator pushes the button part 36, the AP switch 35 is not turned on.

Thus, the lock apparatus 40 switches the AP switch 35 from the lock-off state to the lock-on state by rotating the display part 3 to the position of just before closing. Because of this, even if a foreign article is put on the computer main body 2 and the button part 36 of the AP switch 35 is pushed via the foreign article due to the closing operation, the AP switch 35 is not turned on.

Therefore, it is possible to securely prevent the electric power of the portable computer 1 from being turned on when the display part 3 is closed and securely prevent an application from being started in error. In addition, since the start in error of the portable computer 1 is prevented, it is possible to prevent unnecessary consumption of the electric power of the battery. Furthermore, it is possible to prevent the display part 53 and the main body 52 from being heated due to turning-on of a back light.

In addition, in this embodiment, the sheet member 41 is provided between the switch main body 37 and the button part 36 forming the AP switch 35 and driven by the interlocking mechanism 10. Therefore, it is possible to realize the lock-on and lock-off of the AP switch 35 under a simple structure.

Furthermore, in this embodiment, the cam part 11 moved based on the rotation of the display part 3 is used for moving the sheet member 41. Because of this, it is possible to make a mechanism for moving the sheet member 41 between the lock-on position and the lock-off position simple and compact. In addition, the cam part 11 is provided at the support shaft 7 rotating in a body with the display part 3. Therefore, it is possible to heighten the detection precision of opening and closing of the display part 3.

In addition, because of the lock mechanism 4 of this embodiment, even if the AP switch 35 is not provided in a state where the AP switch 35 is recessed from a surface of the computer main body apparatus 2, it is possible to prevent the error operation of the AP switch 35 by the operator or due to a foreign article. Hence, the surface part of the AP switch 35 can be made planar with the surface of the computer main body 2 and therefore the operability of the AP switch 35 can be improved.

Figure 12:
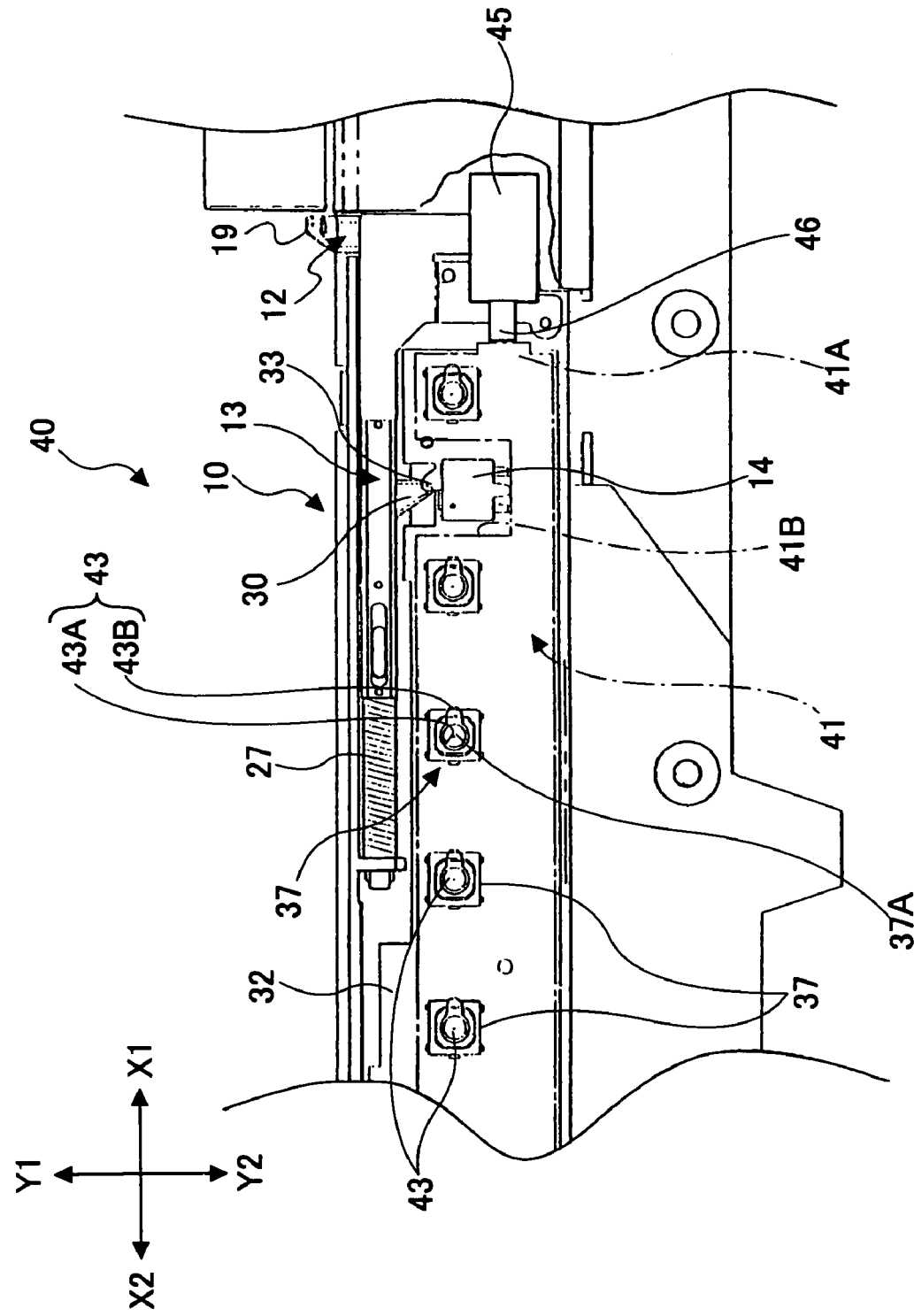
FIG. 12 is an expanded cut-away plan view of a switch lock apparatus of a second embodiment of the present invention in a lock-off state.
Figure 13:
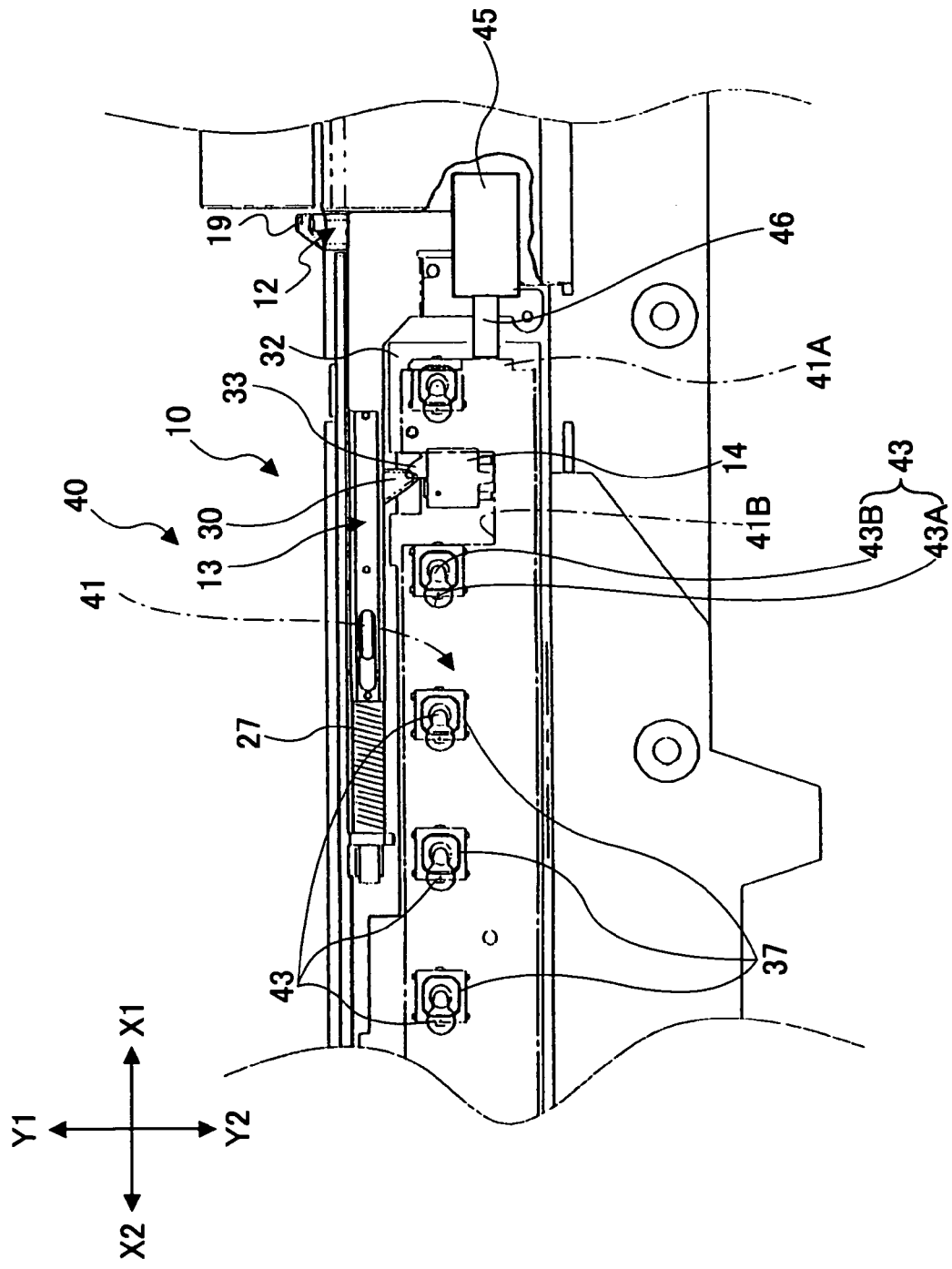
FIG. 13 is an expanded cut-away plan view of the switch lock apparatus of the second embodiment of the present invention in a lock-on state.

Next, a second embodiment of the present invention is discussed. FIG. 12 is an expanded plan view of a switch lock apparatus of a second embodiment of the present invention in a lock-off state. FIG. 13 is an expanded plan view of the switch lock apparatus of the second embodiment of the present invention in a lock-on state. More specifically, FIG. 12 and FIG. 13 show a vicinity of the lock apparatus 40 in a state where the decorative panel 16 and others are removed from the portable computer. In FIG. 12 and FIG. 13, parts that are the same as the parts shown in FIG. 2 through FIG. 11 are given the same reference numerals, and explanation thereof is omitted.

In the lock apparatus 40 of the above-discussed first embodiment of the present invention, the rotation of the support shaft 7 is detected by a mechanical mechanism using the cam part 11, the first arm 12, the second arm 13, and others as the interlocking mechanism 10 driving the sheet member 41. Furthermore, at the time when the display part 3 is rotated to the position of just before closing, the sheet member 41 is moved from the lock-off position to the lock-on position.

On the other hand, in the second embodiment of the present invention, a rotating state of the support shaft 7 is detected by using the rotation detection switch 14 and the sheet member 41 is driven by the solenoid 45 so as to be moved in the X1 and X2 directions. The solenoid 45 moves the driving pin 46 in the X1 and X2 directions by application of an electric current. In addition, the driving pin 46 is connected to the operated part 41A formed at an end part in the X1 direction of the sheet member 41.

In this embodiment, as well as the first embodiment, the second arm 13 is moved in the X2 direction via the interlocking mechanism 10 by rotating the display part 3 in the closing direction. While the switch lever part 30 is moved in the X2 direction based on the moving of the second arm 13, a timing for separating the switch lever part 30 from the switch knob 33 of the rotation detection switch 14 is set to be the time when the display part 3 (the support shaft 7) is rotated to the position just before closing, in this embodiment. Because of this, the rotation detection switch 14 can detect the display part 3 being rotated to the position just before closing.

The rotation detection switch 14 and the solenoid 45 are connected to a control apparatus not shown. When an off-signal is supplied from the rotation detection switch 14, the control apparatus drive-controls the solenoid 45 so that the driving pin 46 is extended (moved in the X2 direction). As a result of this, the sheet member 41 connected to the driving pin 46 is moved in the X2 direction so that the small hole forming part 43B of the piercing hole forming part 43 formed in the sheet member 41 is positioned between the button part 36 and the operation part 37A. Thus, the AP switch 35 can be switched from the lock-off state to the lock-on state by the lock apparatus 40.

Therefore, in the second embodiment as well as the first embodiment, even if the foreign article is put on the computer main body 2 and the button part 36 of the AP switch 35 is pushed via the foreign article due to the closing operation, the AP switch 35 is not turned on.

Therefore, it is possible to securely prevent the electric power of the portable computer 1 from being turned on when the display part 3 is closed and securely prevent the application from being started in error. In addition, since the start in error of the portable computer 1 is prevented, it is possible to prevent unnecessary consumption of the electric power of the battery. Furthermore, it is possible to prevent the display part 53 and the main body 52 from being heated due to turning-on of a back light.

In addition, in this embodiment, the rotation of the display part 3 is detected by using the rotation detection switch 14. Based on the result of the detection, the AP switch 35 is placed in the lock-on state by using the solenoid 45. Hence, it is possible to switch the AP switch 35 with high reliability.

The present invention is not limited to these embodiments, but variations and modifications may be made without departing from the scope of the present invention.

What is claimed is:

1. A switch lock apparatus, comprising:
a switching mechanism configured to switch a switch provided at a main body part where a cover body is rotatably provided to a lock-off state where operation can be done or a lock-on state where the operation cannot be done; and
an interlocking mechanism configured to control the switching mechanism so that the switch is switched to be in the lock-on state based on the cover body being rotated to a closing position,
wherein the interlocking mechanism includes:
a cam part moving based on the rotation of the cover body;
an arm part configured to drive the switching mechanism by being moved; and
a converting mechanism configured to convert the movement of the cam part to the movement of the arm, and
wherein the cam part is formed by a concave part formed in a support shaft rotating in a body with the cover body.

2. A switch lock apparatus, comprising:
a switching mechanism configured to switch a switch provided at a main body part where a cover body is rotatably provided to a lock-off state where operation can be done or a lock-on state where the operation cannot be done; and
an interlocking mechanism configured to control the switching mechanism so that the switch is switched to be in the lock-on state based on the cover body being rotated to a closing position,
wherein the switch is formed by a button part and a switch main body provided so as to face the button part; and
the switching mechanism is formed by a sheet member, the sheet member movably being provided between the button part and the switch main body part, the sheet member having a piercing hole facing the button part and the switch main body in the lock-off state.

3. A switch lock apparatus, comprising:
a switching mechanism configured to switch a switch provided at a main body part where a cover body is rotatably provided to a lock-off state where operation can be done or a lock-on state where the operation cannot be done; and
an interlocking mechanism configured to control the switching mechanism so that the switch is switched to be in the lock-on state based on the cover body being rotated to a closing position, wherein the interlocking mechanism includes:
a rotation detection switch configured to detect rotation of the cover body;
a solenoid configured to drive the switching mechanism; and
a control part configured to drive the solenoid so that the switch is switched to the lock-on state, when the cover body is rotated to the switch lock position, by the rotation detection switch.

4. A portable computer having a computer main body to which a display part is rotatably provided and where a switch is provided, the portable computer comprising:
a switching mechanism configured to switch the switch to a lock-off state where operation can be done or a lock-on state where the operation cannot be done; and
an interlocking mechanism configured to control the switching mechanism so that the switch is switched to be in the lock-on state based on the display part being rotated to a closing position,
wherein the interlocking mechanism includes:
a cam part moving based on the rotation of the cover body;
an arm part configured to drive the switching mechanism by being moved; and
a converting mechanism configured to convert the movement of the cam part to the movement of the arm, and
wherein the cam part is formed by a concave part formed in a support shaft rotating in a body with the cover body.

5. A portable computer having a computer main body to which a display part is rotatably provided and where a switch is provided, the portable computer comprising:

a switching mechanism configured to switch the switch to a lock-off state where operation can be done or a lock-on state where the operation cannot be done; and an interlocking mechanism configured to control the switching mechanism so that the switch is switched to be in the lock-on state based on the display part being rotated to a closing position, wherein the switch is formed by a button part and a switch main body provided so as to face the button part; and the switching mechanism is formed by a sheet member, the sheet member being movably provided between the button part and the switch main body part, the sheet member having a piercing hole facing the button part and the switch main body in the lock-off state.

6. A portable computer having a computer main body to which a display part is rotatably provided and where a switch is provided, the portable computer comprising:

a switching mechanism configured to switch the switch to a lock-off state where operation can be done or a lock-on state where the operation cannot be done; and an interlocking mechanism configured to control the switching mechanism so that the switch is switched to be in the lock-on state based on the display part being rotated to a closing position, wherein the interlocking mechanism includes:

a rotation detection switch configured to detect rotation of the display part;

a solenoid configured to drive the switching mechanism; and a control part configured to drive the solenoid so that the switch is switched to the lock-on state, when the display part is rotated to the switch lock position, by the rotation detection switch.

7. An electronic apparatus having a second housing to which a first housing is rotatably provided and where a switch is provided, the electronic apparatus comprising:

a switching mechanism configured to switch the switch to a lock-off state where an operation can be done or a lock-on state where the operation cannot be done; and an interlocking mechanism configured to control the switching mechanism so that the switch is switched to be in the lock-on state based on the first housing being rotated to a closing position, wherein the interlocking mechanism includes:

a cam part moving based on the rotation of the cover body;

an arm part configured to drive the switching mechanism by being moved; and a converting mechanism configured to convert the movement of the cam part to the movement of the arm, and wherein the cam part is formed by a concave part formed in a support shaft rotating in a body with the cover body.

8. An electronic apparatus having a second housing to which a first housing is rotatably provided and where a switch is provided, the electronic apparatus comprising:

a switching mechanism configured to switch the switch to a lock-off state where an operation can be done or a lock-on state where the operation cannot be done; and an interlocking mechanism configured to control the switching mechanism so that the switch is switched to be in the lock-on state based on the first housing being rotated to a closing position, wherein the switch is formed by a button part and a switch main body provided so as to face the button part; and the switching mechanism is formed by a sheet member, the sheet member being movably provided between the button part and the switch main body part, the sheet member having a piercing hole facing the button part and the switch main body in the lock-off state.

9. An electronic apparatus having a second housing to which a first housing is rotatably provided and where a switch is provided, the electronic apparatus comprising:

a switching mechanism configured to switch the switch to a lock-off state where an operation can be done or a lock-on state where the operation cannot be done; and an interlocking mechanism configured to control the switching mechanism so that the switch is switched to be in the lock-on state based on the first housing being rotated to a closing position, wherein the interlocking mechanism includes:

a rotation detection switch configured to detect rotation of the first housing;

a solenoid configured to drive the switching mechanism; and a control part configured to drive the solenoid so that the switch is switched to the lock-on state, when the first housing is rotated to the switch lock position, by the rotation detection switch.

* * * * *